United States Patent

Blose

[15] 3,702,460
[45] Nov. 7, 1972

[54] COMMUNICATIONS SYSTEM FOR ELECTRIC POWER UTILITY

[72] Inventor: John B. Blose, 2195 Winding Way, Broomall, Pa. 19008

[22] Filed: Nov. 30, 1971

[21] Appl. No.: 203,348

Related U.S. Application Data

[63] Continuation-in-part of Ser. No. 846,336, July 31, 1969, abandoned.

[52] U.S. Cl..................................340/150, 340/310
[51] Int. Cl..........................H04b 13/02, H04q 11/00
[58] Field of Search ...340/310, 150, 151, 152; 307/3

[56] References Cited

UNITED STATES PATENTS

| | | | |
|---|---|---|---|
| 2,263,389 | 11/1941 | Koenig | 340/310 |
| 2,743,434 | 4/1956 | Fleming | 340/310 |
| 2,756,414 | 7/1956 | Doremus | 340/310 |
| 2,860,324 | 11/1958 | Berger et al. | 340/310 |
| 3,114,900 | 12/1963 | Anderson | 340/182 |
| 3,098,215 | 7/1963 | Waite | 340/151 |
| 3,264,633 | 8/1966 | Hellar | 340/310 |
| 3,445,814 | 5/1969 | Spalti | 340/151 |
| 3,484,694 | 12/1969 | Brothman | 340/151 X |
| 3,508,243 | 4/1970 | Nyfeller | 340/310 |
| 3,551,890 | 12/1970 | Silverman | 340/171 |
| R26,331 | 1/1968 | Brothman et al. | 340/151 X |

OTHER PUBLICATIONS

AIEE Technical Paper, 45-77, December 1944, The Combination of Supervisory Control with Other Functions on Power Line Carrier Channels, RC Cheek et al., pgs 1-9, FIGS. 1-5

*Primary Examiner*—Donald J. Yusko
*Attorney*—Henry N. Paul, Jr., et al.

[57] ABSTRACT

An electric power utility communication system is disclosed comprising a plurality of geographically distributed group control units and groups of terminal processor units, with each such terminal processor unit within a group coupled to a respective group control unit through the neutral conductor of the power utility distribution lines. Availability of the neutral as a communications link is achieved by inserting a parallel resonant circuit between the neutral and ground at each ground point in the system. Alternately, the signal generating and/or receiving equipment may be connected between the conventionally grounded neutral and deep earth ground, to develop the communications signal across the earth impedance. Communications information is transmitted over the neutral by coded high frequency signals to the terminal processor units which have electronic logic capacity to accept and perform command functions, interrogate meters, and transmit information back over the neutral to their respective group control units. Overall control is achieved by a central computer controller coupled to each group control unit by conventional transmission means, and which generates and receives coded signals through the group control units.

18 Claims, 10 Drawing Figures

INVENTOR.
John B. Blose

BY Paul & Paul
ATTORNEYS.

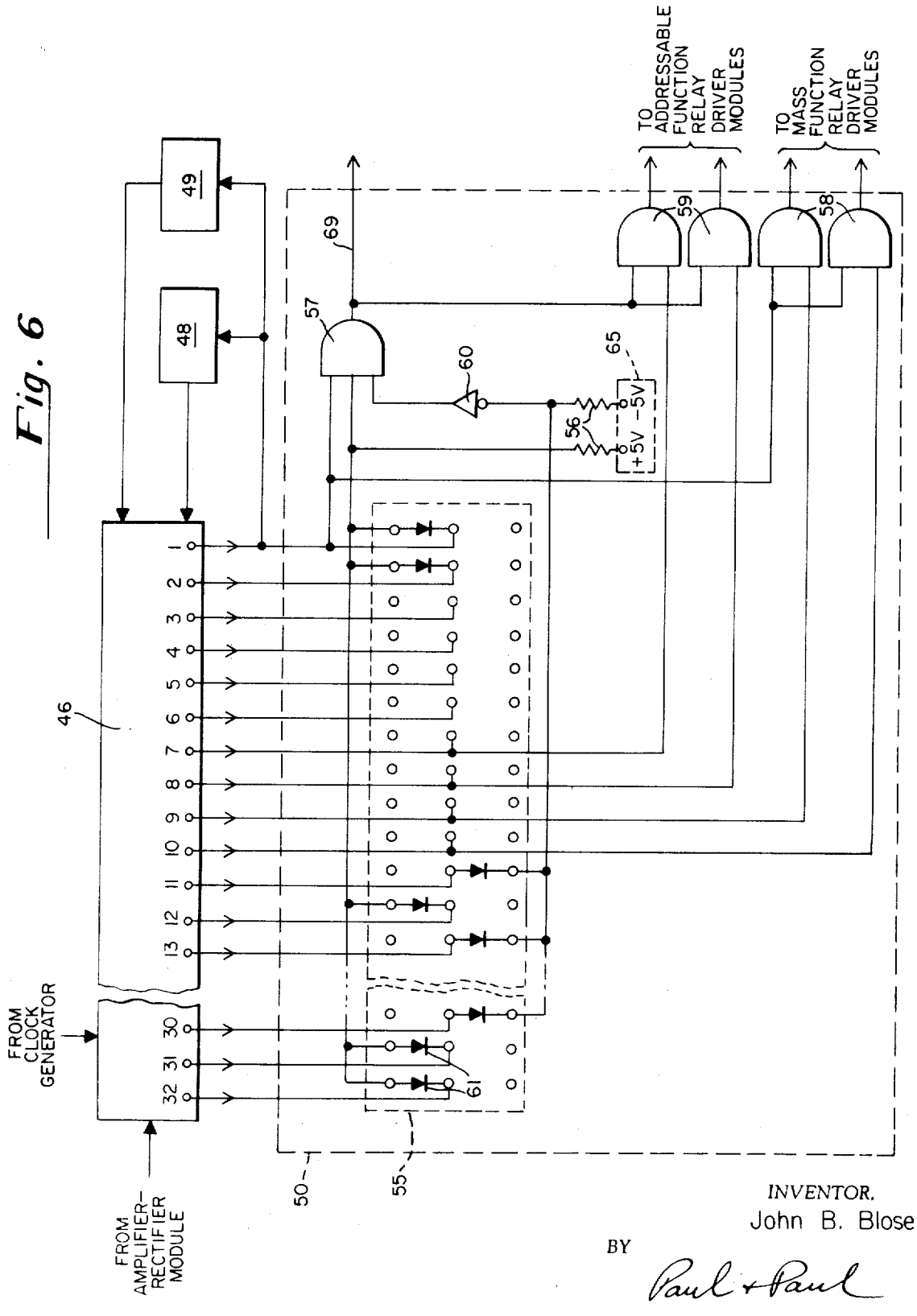

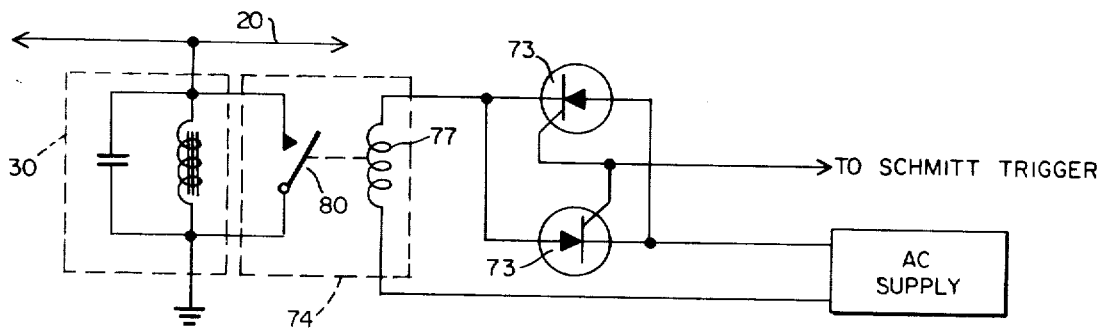
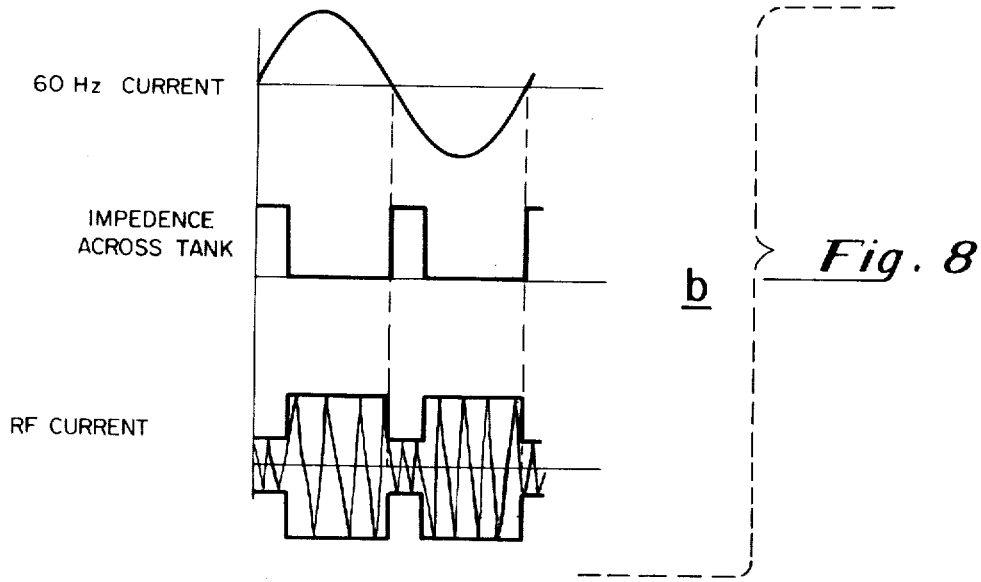
Fig. 8
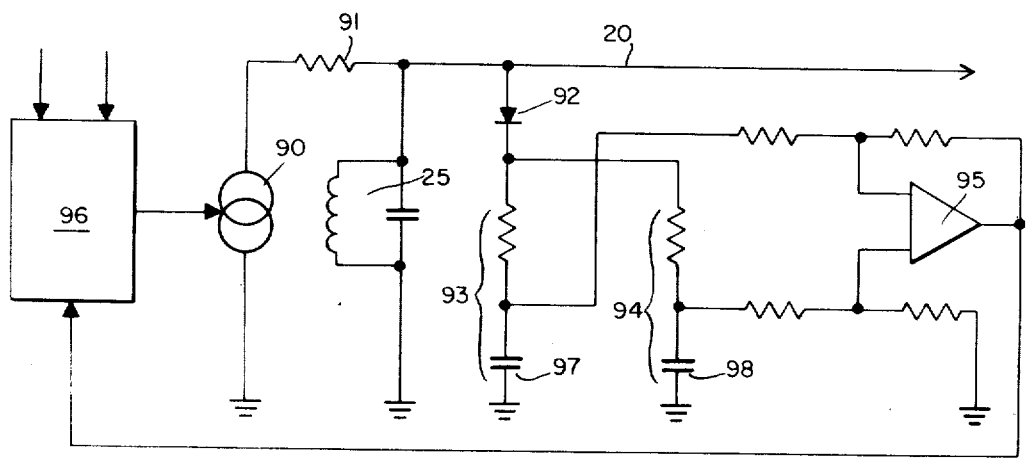
Fig. 9
INVENTOR.
John B. Blose

COMMUNICATIONS SYSTEM FOR ELECTRIC POWER UTILITY

CROSS-REFERENCE TO RELATED APPLICATIONS

This application is a continuation-in-part of the co-pending U.S. Pat. application, Ser. No. 846,336, filed July 31, 1969 now abandoned.

BACKGROUND OF THE INVENTION

1. Field of the Invention

This invention lies in the field of communication systems for electric power utilities and, more particularly, computer-controlled communication systems for total two-way communication with all terminals tied into the electric power utility.

2. Description of the Prior Art

A communications system for an electric power utility embracing total customers' communications has long been merely an idealized concept which has not given way to realization. There is much prior art devoted to the objective of remote meter reading as well as remote control of other specific operations. However, no economically feasible system has yet been attained which would achieve these goals. The failure to achieve such a system lies primarily in the high cost of communication links. It is evident that the establishment of a totally independent communication link would be economically impossible. Considerable effort has been devoted to the logical idea of utilizing existing telephone channels for such use, but such systems would remain expensive, slow aNd inflexible. It would be necessary to provide a protector at each terminal to couple the telephone lines to the power utility, which would be a substantial expense, in addition to the lease expense payable to the telephone company. Further, such a system would be inherently slow inasmuch as there would be time delays while switching routes were obtained for each terminal. And lastly, mass control of all terminal installations would be impossible, because there would not be sufficient communication links into each terminal and, indeed, not all terminal locations are serviced by telephone lines.

There have been many systems proposed and developed which have utilized the high voltage or phase wire or wires of the utility transmission network for carrying high frequency carrier signals, for the purpose of carrying out a specified remote control operation. However, these systems contain substantial inherent problems. The use of a phase wire or wires presents the difficulty of transmitting through transformers, which difficulty can be overcome with a reasonable degree of success, but with concomitant expense. Secondly, use of the phase wires presents the problem of maintaining continuous channels. It is well known that in utility systems it is necessary to reroute power from time to time, which rerouting would interfere with the communications channel. And thirdly, the transmission of high frequency signals across power transmission lines would be subject to impedance matching, inasmuch as the loads of electric power utilities vary from time to time in accordance with varying industrial and residential requirements. Such time varying loading would cause corresponding mismatch problems which would have to be dealt with, adding to complexity and cost of the system. And, of course, if the phase or power lines are to be utilized, all equipment coupled to such lines would have to be high voltage equipment, with corresponding high costs. Thus, although communication signals can be injected on a phase wire through suitable coupling devices, and carried through distribution transformers by magnetic or capacitive coupling, reasonable success for such a system cannot be realized so long as circuit impedances remain subject to fluctuation, and distribution circuits must be switched.

The nature of an electric power utility, involving as it does a large number of terminal locations, dictates that in a feasible communications system the expense of the apparatus installed at such terminal locations be maintained at a minimum, while allowing greater expense for more sophisticated equipment for group processing of signals to and from the terminal locations. This consideration has made generally unfeasible the approach of providing radio receiver-transmitter units at each terminal location. In effect, this approach involves the use of as many communications systems as there are terminal locations. By contrast, the desired approach would utilize an existing communications network linking together all terminal locations, and would minimize the complexity of the control apparatus at each terminal location, overall system control being effected through central and group control apparatus which, being required in smaller numbers, can be of greater sophistication. Thus, the desired logistical approach is to use the present existing electric power utility transmission lines as the system communications link, install the minimum required apparatus at each terminal location, and control the overall system with a sophisticated control device, e.g., a general purpose computer and a number of intermediate control stages as dictated by system requirements. Such a system can be achieved only by utilizing the existing transmission network in a manner that overcomes the limitations which are set forth hereinabove.

The existing limitations which accompany utilization of the phase conductors for transmission of coded information may be avoided by utilizing the neutral conductor. For any given distribution circuit within a system, the neutral is a hard wire connection common to the substation and all customers coupled to such substation. The neutral bypasses distribution transformers, presenting a continuous conductor to all terminal locations. The neutral, then, in combination with ground, presents a potentially practical solution to the transmission problem. The neutral, however, is commonly grounded at every terminal location, as well as at transformers and other utility points, and for this reason it is generally believed to be unavailable as a communications link. However, this invention shows that it can be effectively and practicably isolated above ground for purposes of the communications frequency which is utilized while being maintained as an effective ground for power-frequency energy transmission. By use of a relatively high frequency carrier signal for communications purposes, and a suitable frequency-selective coupling impedance at each ground point, the neutral wire is made available as a communications link tied to all terminal locations. Although other proposed two wire systems have utilized the neutral as well as one phase wire, it is a unique concept of this invention to utilize the neutral with ground return as the primary communication link to terminal locations.

SUMMARY OF THE INVENTION

The primary object of this invention is to provide a communication system for an electric power utility which utilizes the neutral conductor of the existing transmission network in conjunction with efficient means for coupling an RF signal to and from the neutral while maintaining the neutral electrically grounded.

It is a further object of this invention to provide electric power utility communication apparatus which is conveniently installed, inexpensive, and free of interference from power transmission.

It is a further object of this invention to provide a total communication system for an electric power utility which can interrogate and/or control on an individual terminal location basis, as well as control on a group basis.

It is a further object of this invention to provide a communication system for an electric power utility having circuitry at each terminal location for detecting address information and for carrying out commands when individually addressed.

It is a further object of this invention to provide a system which is controlled by and compatible with a general purpose digital computer.

It is a still further object of this invention to provide a communication system which links to all customers of an electric power utility, as well as all controllable system elements.

It is a still further object of this invention to provide a reliable communication system which operates without any adverse effect upon steady state power transmission while utilizing the power transmission network.

It is a still further object of this invention to provide a method for communicating throughout the system of this invention for reading data devices, and controlling system elements.

It is a yet still further object of this invention to provide a method of computer control of communication throughout the system of this invention.

Accordingly, this invention comprises a communication system for an electric power utility in which the neutral conductor of the power transmission network of said utility is used as a communication link between a group information processor and a plurality of individual terminal information processors, the group information processor being in turn linked by conventional communication means to a master computer controller. A high frequency carrier signal modulated with binary coded signals and synchronized with the utility power frequency is transmitted from the master controller to the group processor, where it is demodulated and transmitted as pulses of radio frequency (RF) current over the neutral conductors to all the terminal processors controlled by such group processor. Parallel resonant tank circuits are connected between the neutral and ground at the group processor and at each terminal processor or system ground, to provide a substantial impedance between neutral and ground at the RF frequency, while providing a low impedance connection to ground for the low frequency power currents. Alternately, the group processor and terminal processors may be connected between the neutral, which is connected to system ground, and deep earth ground, to develop the RF signals across earth impedance. The terminal processor contains detection circuitry to receive commands addressed to that particular terminal processor, or commands addressed to all processors coupled to a given group processor, as well as logic circuitry for reading encoded meters, circuitry for controlling function drivers, and signal generating circuitry for transmitting coded signals back to the group processor. Each group processor, in turn, contains detection circuitry to receive coded signals, and transceiver circuitry for interfacing with the central computer controller.

In operation, control is achieved by a master computer which communicates with a plurality of group processors, each group processor in turn communicating with a plurality of terminal processors. Each group processor is in communication with residential installations and utility apparatus encompassed in a predetermined system area limited only by the location of isolating impedances coupled into the neutral for purposes of group separation.

BRIEF DESCRIPTION OF THE DRAWINGS

FIG. 6 is a combined block diagram and schematic diagram of the address comparator module and data receiving shift register.

FIG. 8a is a schematic diagram of the return signal generator; FIG. 8b comprises waveforms in the return signal generator.

FIG. 9 is a schematic diagram of the group processor circuitry for receiving data from terminal processors.

DESCRIPTION OF THE PREFERRED EMBODIMENTS

Figure 1:
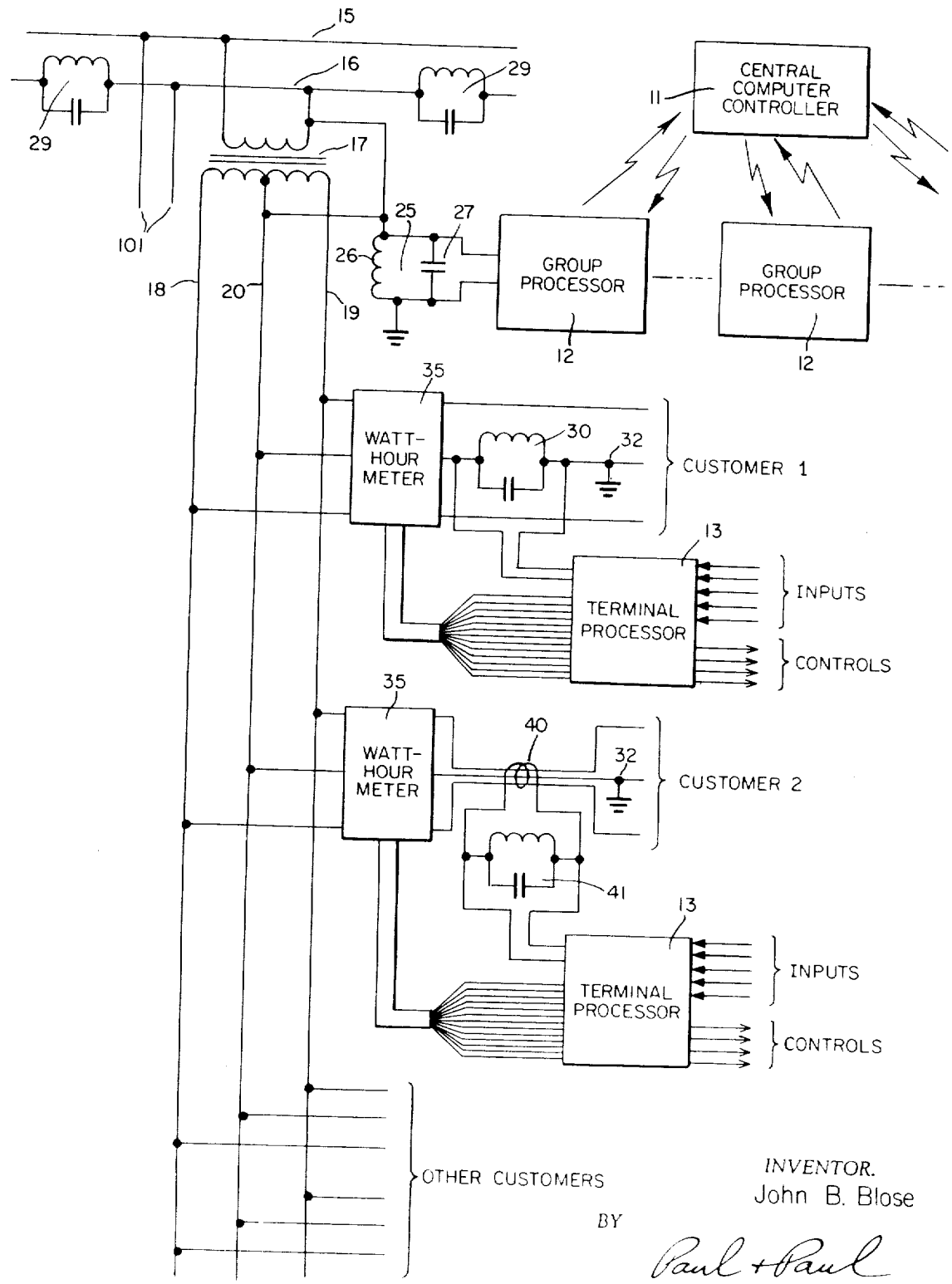
FIG. 1 shows a combined block diagram and schematic diagram of the overall communication system.

Referring now to the drawings, FIG. 1 presents a diagram of the overall system. The overall system control is provided by central controller 11 which comprises a general purpose digital computer. The computer is of a type and capacity to store data pertaining to the entire system, and to be programmed to perform the system interrogations and function commands as are described hereinbelow. It is to be noted that central controller 11 could comprise, in addition to a computer, buffer storage elements and intermediate control devices located at remote locations from the main computer. The problems of data storage in multiple locations and the desirability of central as opposed to regional control will depend upon the electric power utility to which this invention is applied, and is a software consideration which is related to but not within the scope of the invention as claimed. For purposes of illustration of this invention, it will henceforth be assumed that a single central computer is utilized to perform all of the control functions of controller 11.

The central controller 11 communicates with group processor units 12 through conventional communication means. This communication is preferably in the form of pulse coded signals which are sent to the group processor from the central controller, and vice versa, the group processor acting as an intermediate control unit for coupling the overall system to a plurality of terminal processor units 13.

The manner of coding information which is transmitted between the central controller 11 and group processor units is a variable of the system design and could take any form, such as audio modulation of a carrier. Due to the binary nature of digital computers, and in order to achieve efficient communication with the binary-oriented terminal processors, as described hereinbelow, the preferred embodiment of this invention utilizes pulse modulation of a carrier, the presence of a pulse representing a binary "1" and the absence of a pulse representing a binary "0." Further, for reasons of overall system design as disclosed hereinbelow, it is desirable that the pulses be synchronized with the power frequency, i.e., 60 Hz.

The number of group processors 12, while substantial, may be orders of magnitude smaller than the number of terminal processors 13 with which this system is to be linked and, accordingly, the group processor 12 and the transmission link between same and the central controller 11 may be reasonably sophisticated. A preferred mode of transmission is radio, at microwave carrier frequencies, subject to FCC regulations. Each group processor, then, would comprise a transceiver for decoding the received microwave signals and re-encoding them for transmission over the neutral wires. The process is reversed for re-transmitting data collected from the terminal processors back to the central controller. In the preferred embodiment, the group processor 12 comprises conventional demodulation circuitry for converting the microwave information into a pulse modulated radio frequency (RF) signal which is then transmitted over the neutral lines of the utility transmission network to the terminal processors contained within its group limits. The carrier for such RF signal has a frequency within the range of 20 to 300 kHz, the conventional range for carrier frequencies used in other utility communications systems.

It is understood that alternate methods could be used to link the group processors with the central controller. Since cost is relatively unimportant at this level of control, a sophisticated carrier current system coupling to the high voltage lines and by-passing transformers with suitable magnetic or capacitive coupling may be utilized for the relatively long distance communications to and from the group processor. Alternately, either leased or switched telephone lines could be utilized, although mass operations, as discussed hereinbelow, would be impractical over switched telephone lines. The choice of radio transmission for the preferred embodiment is based upon as assessment of all the system variables, particularly flexibility and reliability.

Still referring to FIG. 1, a portion of an electric power utility transmission network is shown including a primary phase conductor 15 in combination with a neutral 16, the phase conductor 15 being generally one phase conductor of a three phase transmission line. These primary conductors are tied to a distribution transformer 17, the secondary terminals being tied to phase conductors 18 and 19, and the center tap being tied to a neutral conductor 20. In general practice, the phase conductors 18 and 19 are 120 volts above neutral 20, with 240 volts AC appearing between lines 18 and 19. The primary neutral 16 is generally hard wired to the secondary neutral 20 or, if this is not the case, it can be quickly and easily accomplished. The neutral conductor, in both the primary and second networks, is generally tied to ground at a plurality of points, e.g., other transformers and customer locations. This ground is what is referred to herein as system ground and, in practice, differs from true earth ground as explained hereinbelow. A main feature of this invention is to utilize the neutral for communications purposes, while simultaneously tying it to ground for purposes of power distribution.

Figure 2:
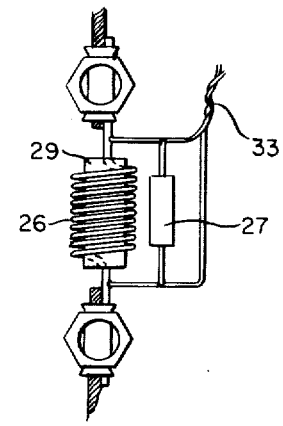
FIG. 2 is a perspective view of a parallel resonant tank circuit.

In one embodiment, as illustrated in FIG. 1, the group processor 12 is coupled to the neutral 20 through a parallel resonant tank circuit 25 which comprises an inductor coil 26 in parallel with a capacitor 27. The inductor 26 and capacitor 27 are chosen of appropriate values such that the tank circuit is effectively a short circuit to ground for the 60 Hz power current, and presents a high impedance at the communication frequency. The construction of a suitable parallel resonant circuit is shown in FIG. 2. The coil 26 consists typically of about 10 turns of wire wound about a one-half inch diameter ferrite core 24, having sufficient capacity to carry fault currents. Coil 26 is connected in parallel with capacitor 27 whose capacitance is selected for resonance at the carrier frequency. Insulated signal leads 33 are used to couple the parallel resonant circuit to the group processor 12.

Figure 3:
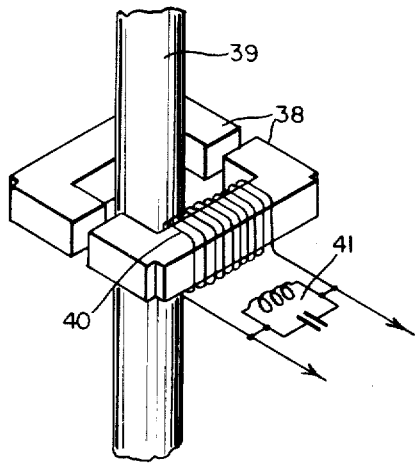
FIG. 3 is a perspective view of a split core transformer combined with a parallel resonant tank circuit.

An alternate form of coupling circuit for use between the neutral and the customer ground is shown in FIG. 3. A split magnetic core 38 is shown in two roughly equal halves, which can be conveniently mounted around the service entrance cable 39 which comprises the two energized conductors as well as the neutral. A transformer secondary winding 40 is coupled to a tank circuit 41 which also has a high impedance at the communication frequency, and a low impedance at the 60 Hz power frequency. It is apparent that this embodiment presents an advantage in terms of ease of installation, as the neutral line need not be separated and disconnected in order to install the coupling circuit. It is necessary only to clamp the split core directly around the entire service cable 39 on either side of the watthour meter, a relatively simple installation. It is to be noted that ideally the return current through the neutral will balance out the 60 Hz current through the energized conductors, in which case the transformer secondary winding would pick up no 60 Hz signal. However, in practice there will be an undetermined net amount of 60 Hz voltage pickup which, however, would be attenuated by tank circuit 41. It is also to be noted that it is important that core 38 be designed such that it not saturate from the anticipated unbalanced power currents through cable 39.

It is to be noted that in practice, the best impedance that can be obtained with the tank circuit is on the order of several ohms. This is because of the necessary trade off between the impedance of the tank circuit versus the impedance of the line. At high frequencies, a considerable self inductance in the line causes substantial attenuation, offsetting the high attainable tank impedance at such high frequency. Conversely, at low frequencies, while there is much less line attenuation, it is difficult to get a sufficiently high tank impedance. As a practical result, the tank circuit may present an impedance of only a few ohms, resulting in signal attenuation between transmitter and receiver, or group processor and terminal processor.

Figure 10:
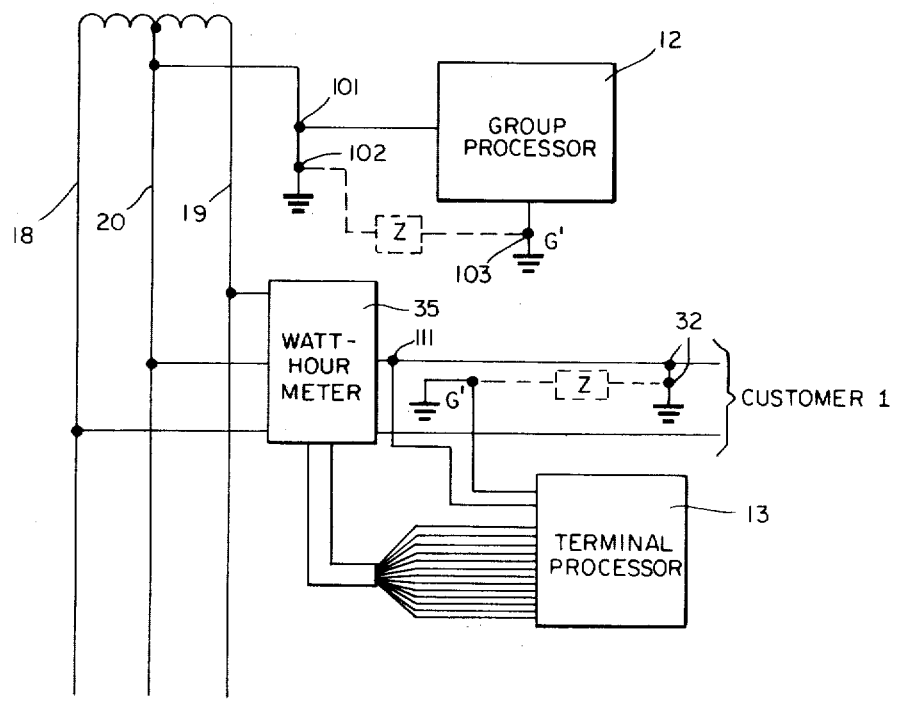
FIG. 10 is a schematic diagram of a portion of the system shown in FIG. 1, showing an alternate way of coupling signals to and from the system neutral.

Referring now to FIG. 10, there is shown another means of coupling to and from the neutral, which reduces the aforesaid transmission attenuation. FIG. 10 illustrates a portion of the system shown in FIG. 1, incorporating a group processor and a single customer station, with communications over the neutral line 20. It is to be understood that, while this illustration is limited to a single customer, any number of customers may be tied on to the line in a similar manner, or using either circuit 30 or 40 as shown in FIG. 1.

In this alternate embodiment, no tank circuit is connected to the group processor. Terminal 101, connected to the neutral line 20, is tied directly to system ground at 102. System ground is generally achieved by tying on to a water pipe or similar member considered to be physically tied to earth ground. However, as is known in the art, there is a substantial impedance between such a system ground and true earth ground. It is of such substantial impedance that this alternate embodiment takes advantage. Terminal 101 is also tied to one output terminal of group processor 12, the other output terminal being connected through a metallic ground rod, not shown, to point 103 which is designated at G', meaning true earth ground. The metallic ground rod is suitably of several feet in length, composed of a high conductance metal, and may be driven into the earth at any convenient location, preferably immediately adjacent to the customer's house or dwelling. There is shown, by dashed line, an impedance Z between points 102 and 103, which represents the complex impedance, nominally several tens of ohms, between conventional ground point 102 and true earth ground 103. It is impedance Z across which the output of group processor 12 is developed, and which, in this circuit, permits maintenance of the signal at terminal 101.

At the customer location, the tank circuit 30 may be eliminated, with terminal 111, tied to neutral line 20, connected directly to terminal 32 which is tied to system ground. Terminal 111 is also tied to one of the two input terminals of processor 13, with the other terminal being connected through a similar metallic ground rod to real earth ground G'. As shown by the dotted line, there exists an effective impedance Z between real earth ground G' and system ground 32, across which the received signal is developed and coupled to terminal processor 13.

In testing this improved ground technique, as shown in FIG. 10, it was found that the signal extracted at the receiving end, i.e., between the neutral wire and the driven ground rod, was greater in strength than for the embodiment using the tank circuits as shown in FIG. 1. For example, for a test over a distance of 450 feet, using a 100 kHz signal in the circuit of FIG. 1, a 5 volt peak-to-peak amplitude coupled to a tank 25 was detected as a 50 millivolt peak-to-peak signal at the customer's location. Using the ground scheme of FIG. 10, a 6 volt peak-to-peak signal inserted at the same place, but with the arrangement shown in FIG. 10, was detected at the same customer location as a 5 volt peak-to-peak received signal. The improved result is due to the fact that the earth impedance Z is greater than the practically available tank circuit impedance.

With the system as described thus far, means have been provided for coupling coded signals, originating in a central computer, through a plurality of group processors, to the neutral conductors of a utility transmission network. In the secondary distribution line, the neutral is normally tied to ground at each customer location, and in the primary lines, the neutral will be tied to ground at other distribution transformers, capacitor banks, etc. In order that a given group processor be able to communicate with the desired group of terminals, and also that the signals not be shunted to ground at each customer location, it is necessary to delimit the group area by in effect isolating the neutral at group area limits and from all ground points by suitable impedances which will maintain an effective short circuit for the 60 Hz power currents. The first requirement is met by placing a parallel resonant circuit 29 in series with the neutral conductor at the intended limits of the group area, circuit 29 having the same properties as circuit 27, i.e., a relatively high impedance to the communication frequencies being used by the system, and an effective short circuit to 60 Hz. Thus, circuit 29 will have no effect on power distribution, and will block transmission of communication signals. Similarly, a parallel resonant circuit 30 is shown inserted between the neutral conductor 20 and customer ground 32. Generally, this parallel resonant circuit will be intimately associated with the customer's watthour meter 35, but for purposes of illustration it is shown as being separate. Again, the effect is to provide a resonant impedance at the communication frequency such that the signal transmitted along neutral 20 appears across circuit 30, while the neutral is effectively shunted directly to ground for the 60 Hz power currents.

Referring again to FIG. 1, it is seen that each group processor 12 is thus placed in direct communication with a plurality of terminal processors or data points on both the secondary neutral and the primary neutral. The size of the groups within the overall system organization is determined largely by locations of the terminal processors and considerations of system sensitivity. Groups of about 100 data points are reasonable building blocks for efficient transmission to and from the group processor. With the resonant tank circuits 30, 41 as disclosed above, RF signals in excess of about 10 millivolts can be received and processed, such signals being well above the existing noise level.

Turning now to the terminal processor unit 13, it is seen that this unit performs the system functions of receiving communication signals transmitted from group processor 12 and appearing across the resonant tank circuit 30 or 41, processing same, controlling a plurality of controllable elements at the customer location, interrogating information-containing elements such as meters, and transmitting data back through the neutral conductor to the group processor. In short, the terminal processor is a logic device which interfaces through the group processor with a remote computer to perform control functions and to gather information and re-transmit it to such remote computer.

To achieve the desired system flexibility and the capability of total communications between a central controller and all controllable elements tied into the electric power utility, it is necessary that the terminal processor be capable of individual interrogation by the computer or master controller, and, alternately, be capable of mass control along with all other terminal processors in the group or system. The capability and requirements of the terminal processor will be developed more fully with a discussion of typical functions which it performs.

Figure 4:
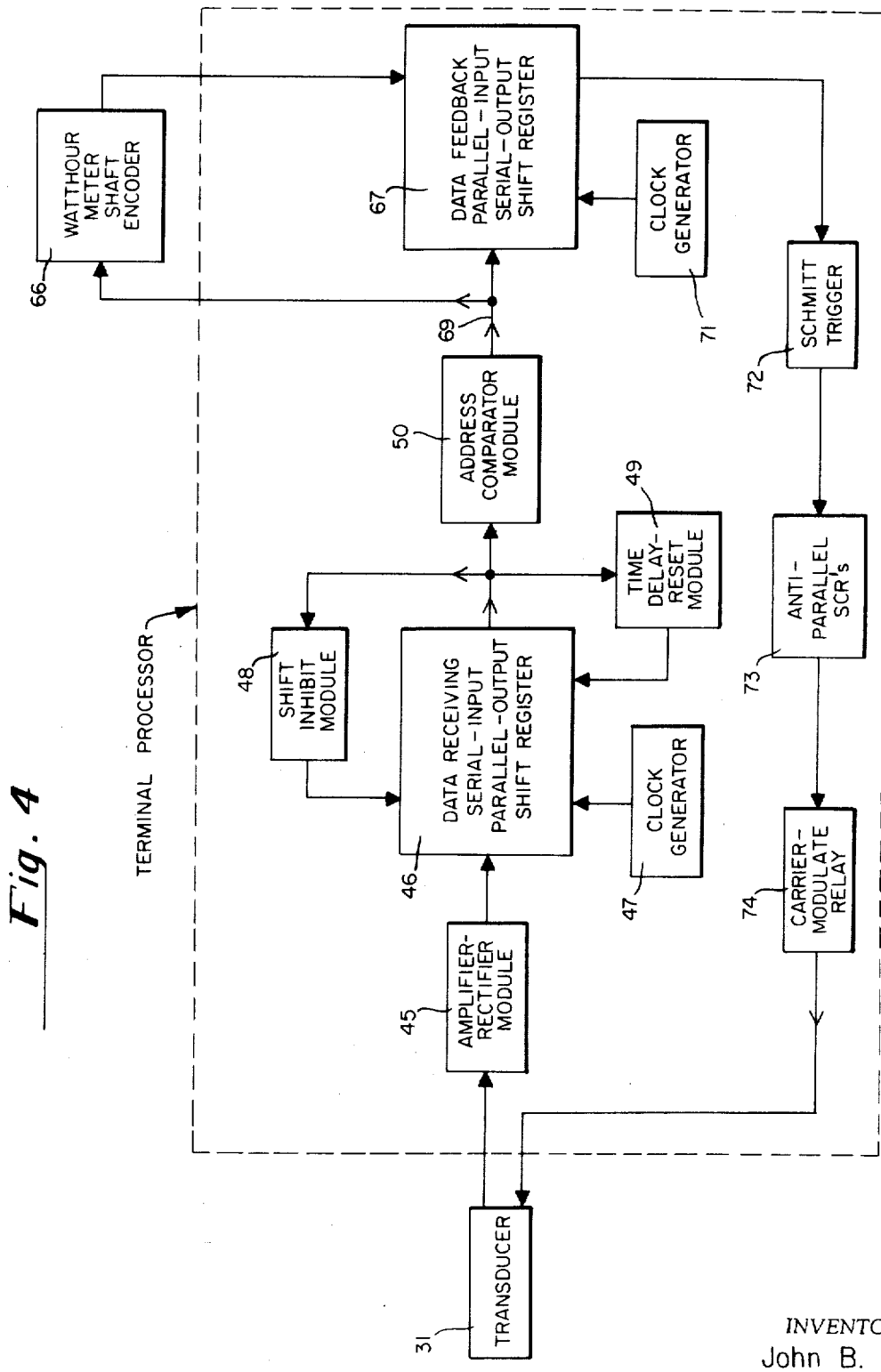
FIG. 4 is a block diagram of a terminal processor, showing the flow of information in the operation of reading a watthour meter encoder.

Referring now to FIG. 4, a block diagram of the terminal processor 13 is shown, including information flow for the remote reading of a watthour meter 35. The communication signal developed across transducer 31, which represents either tank circuit 30 or tank circuit 41, appearing in the form of a train of RF pulses, is coupled to an amplifier-rectifier module 45. Module 45 is comprised of conventional amplifying circuits providing a gain sufficient to drive the subsequent data processing circuitry. It also provides further filtering out of any 60 Hz signal developed across the transducer 31. The signal is rectified by conventional rectifiers to provide a pulse train, the pulses being synchronized with the utility 60 Hz current. The resulting pulse train is coupled into a conventional binary-data shift register 46 having serial input and parallel output. The train of input pulses is necessarily received in serial timewise, and is combined with clock pulses from a conventional clock generator 47 which is energized from a 60 Hz power source and supplies uniformly timed pulses. The timing pulses drive the shift register, shifting the information in each register position to the succeeding position, until the first data pulse reaches the final position in the register.

In the preferred embodiment of this invention, the shift register 46 may contain suitably 32 bits, this being adequate for any foreseeable number of addresses which are incorporated into the system, plus a desired number of commands.

The desired number of bits corresponds to the content of the pulse train, or data "word" transmitted from the computer. Typically, the word may contain 22 bits for the address, 9 bits for commands, and 1 bit for control purposes. The arrangement of information within the word is described in detail in the discussion of the address comparator hereinbelow.

When register 46 is fully loaded a binary "1," representing the control signal, is loaded in the first position of the register, and activates a conventional shift-inhibit module 48 to cut off any subsequent incoming signals. The shift register 46 may have a conventional shift-inhibit terminal and a reset terminal, such as comprised in the MM408 or MM508 High Speed Serial-input Parallel-output 8-bit Static Register marketed by National Semiconductor Corp., of 2975 San Ysidro Way, Santa Clara, California. When a shift-inhibit terminal is available, the shift-inhibit module 48 may be a buffer amplifier which is arranged to change the voltage appearing at the first position of the shift register 46 to the voltage value necessary to actuate the shift inhibit function. Additionally, a conventional time-delay-reset module 49 is similarly actuated to cause shift register 46 to reset all positions to zero after a 0.5 second time period. The time-delay-reset module 49 may comprise a Dual Delay Multivibrator type M302 marketed by Digital Equipment Corporation of 148 Main Street, Maynard, Mass., used to actuate the reset terminal of the shift register 46. In such case a supplemental capacitor and a buffer amplifier are used to condition the output to match the shift register reset voltage requirement. During such 0.5 second period, the group processor is programmed to transmit a continuous RF current over the neutral conductors, the reason for which will become apparent in the discussion below of transmission of data back to the group processor.

Referring now to FIG. 6, it is seen that the data stored in shift register 46 is available in parallel, and is parallel coupled to address comparator module 50. The address comparator is the logic circuitry of the terminal processor which enables it to determine when it has been interrogated, to start feedback of data, and to route function commands to the proper drivers. As was discussed above, 22 bits is a probable allocation for addresses. However, this number is variable, and for purposes of illustration any number of bits in any location in shift register 46 can be assigned to carry address information.

Address comparator module 50 comprises a diode code board 55, a positive and negative DC voltage source 65 fed through suitable loading resistors 56, a three-input AND gate 57, and a plurality of two-input AND gates 58, 59 which drive function relays cooperating with controllable elements. Each of a plurality, less than the total number, of the input terminals of the diode code board 55 is connected through a respective diode to a similarly numbered output terminal which in turn is connected either to the positive voltage source or to the negative voltage source, according to a desired address code. When the shift register 46 has been fully loaded with address and command data, and during the 0.5 second interval, a binary "1" will be in the No. 1 position, and a binary "1" or "0," corresponding typically to plus 10 volts and minus 10 volts, will be in each other shift register position.

The voltage output from the No. 1 position of the shift register 46 is tied to the shift-inhibit module 48, the reset module 49, and the No. 1 diode on diode code board 55. It is also applied directly to one of the three inputs of the three-input AND gate 57, and to one of the two inputs of each of the two-input mass function AND gates 58. Each of the remaining positions of shift register 46 assigned to the address function is coupled to one terminal of a corresponding diode, the other terminal of each such diode being connected through a resistor 56 to either the plus DC voltage or the minus DC voltage, according to the specified address code.

In order to understand the operation of address comparison, it is necessary to examine the manner in which each of the respective address diodes 61 is biased. Each of the diodes having a terminal connected to the plus DC voltage is arranged such that its cathode is coupled to the corresponding shift register position, and its anode is coupled through resistor 56 to the plus voltage. Each such diode will be reverse biased when its corresponding register position contains a binary "1," or plus 10 volts which is placed on its cathode, it then being reversed biased by 5 volts and in a consequent blocking condition. If, but only if, each and every one of the diodes so tied to the plus DC voltage is in such a blocking condition, corresponding to a condition when each corresponding shift register position contains a binary "1," plus 5 volts will be placed at the second input of the three-input AND gate 57. If any one of such shift register positions contains a binary "0" or negative 10 volt signal, such diode will be positively biased and will assume a conducting state, clamping the minus 10 volt signal upon the second input of gate 57. Under these circumstances, AND gate 57 will not conduct. In a similar fashion, each of the diodes connected to the negative voltage terminal has its cathode coupled through a resistor 56 to the minus DC voltage, and its anode coupled through to the respective shift register position. For these diodes, a binary "1" positively biases the diodes, in which case plus 10 volts is applied to the input of the inverter 60. It is to be noted that if any one of such diodes is so positively biased, it will clamp a positive voltage at the input to inverter 60, the output of which is a negative voltage and is applied to the third terminal of the three-input AND gate 57, holding said gate in a non-conducting position. Similarly, only when all of such diodes which are coupled to the negative DC voltage are back biased, i.e., when all corresponding shift register positions contain zero, or negative voltage, will a minus voltage be applied to the input of the inverter 60, thereby producing a plus signal at the gate input to AND gate 57.

From the preceding discussion, it is observed that the positive DC voltage and corresponding loading resistor 56 in combination with the diodes connected thereto constitute a multiple-input AND gate. Similarly, the negative DC voltage and the loading resistor 56 connected to it in combination with the diodes connected thereto constitute a multiple-input negative logic AND gate, which gate produces a negative output signal at the input to inverter 60 only when there is no binary "1" coupled to any of the diode inputs. For purposes of this application, the multiple-input negative logic AND gate is referred to as a NAND gate. It is understood that different circuit equivalents of the described AND gate and NAND gate, bearing different terminology, may be utilized.

Since the negative voltage signal applied to the input of inverter 60 is inverted to a positive voltage at the third input of the AND gate 57, AND gate 57 will produce an output signal only upon the desired simultaneous occurrence of the following:

a. a binary "1" signal appears at position No. 1 of shift register 46;

b. binary "1" signals are applied to all of the positions of shift register 46 coupled to diodes which are connected to the positive DC supply; and, c. all binary "0" signals occur in all of the positions of shift register 46 coupled to diodes which are connected to the negative DC supply.

The diode code board 55 thus represents a permanent hard wired memory which identifies the particular terminal processor in which it resides. Each terminal processor 13 contains a distinct code on its board 55, and is thus distinctly addressable. Upon receipt of an address which does not match the permanent code stored in diode code board 55, AND gate 57 is an open circuit, producing no output signal which can activate the performance of a function. It is to be noted that under normal operations when no command is being sent from the group processor, no binary "1" will be present in position No. 1 of shift register 46, and correspondingly there will be no output. Similarly, position No. 1 will never be loaded with a binary "1" until all other positions have been loaded with either binary "1" or "0," at which time AND gate 57 will conduct only if the aforesaid distinct binary combination has been loaded into the shift register 46.

Still referring to FIG. 6, it is seen that data positions 7, 8, 9 and 10 of shift register 46 are coupled directly through diode code board 55 to input terminals of the two-input AND gates 58, 59. Although four such AND gates are shown, they may be of any number consonant with the bit capacity of shift register 46 and are functionally of two categories. The mass function relay driver AND gates, being gates 58 in FIG. 6, are assigned to mass switching or other mass functions which are performed simultaneously at all terminal processors coupled to a group processor. The other gates 59, identified as addressable function relay driver gates are assigned for the performance of functions at specific addressable terminal processors. Each of the mass function relay driver AND gates and the addressable relay driver AND gates has one of its two inputs connected directly through a connection point of the code board 55 to a respective output position of shift register 46.

Referring to the mass function relay driver gates 58, it is seen that the second input for each such AND gate is connected to the No. 1 position of shift register 46, such that a positive signal will appear at any time a binary "1" appears in such position, this being any time a data word is transmitted from the group processor. Irrespective of any particular address which may or may not be in shift register 46, upon the simultaneous occurrence of a binary "1" at the No. 1 position and also at the position tied to the other input of a mass function relay driver AND gate, such AND gate conducts, providing a signal to energize a respective relay driver module 62.

Referring now to the addressable function relay driver AND gates 59, the second input of each such gate is connected to the output of the three-input AND gate 57. Accordingly, only when the gate 57 conducts by reason of its terminal processor being correctly addressed, and simultaneously therewith a binary "1" appears at the position of shift register 46 connected to the other input lead of the respective addressable function relay driver AND gate, is such an AND gate turned on to energize an associated addressable function relay driver.

Still referring to FIG. 6, the output of AND gate 57 is coupled by lead 69 to other circuit elements within the terminal processor for initiation of automatic feedback of encoded data, such as reading a watthour meter. Since a signal will appear on line 69 only when the terminal processor unit is correctly addressed, data feedback will not be initiated from more than one terminal at a time, thus avoiding ambiguity. It is to be noted that the logic circuitry of the address comparator 50 may be rearranged so that when a plurality of data feedback operations are to be performed, they could be channeled through additional addressable AND gates comparable to addressable gates 59. However, for purposes of illustration, a data feedback signal is presumed to be available to all readable devices whenever a given terminal processor is correctly addressed.

Referring again to FIG. 4, the flow path for the operation of reading a watthour meter is shown. A watthour meter encoder 66 and a data feedback shift register 67 are each coupled to lead 69 and will each be activated by a signal on such lead. At the watthour meter 35, the meter register dial positions containing the desired information are encoded by a conventional meter shaft encoder 66 which, for example, has a set of four contacts for each shaft of the selected dials of the meter, the open or closed conditions of such contacts representing a binary code of the positions of the respective meter dials. Several forms of meter encoder units are available commercially, providing different mechanisms for transforming mechanical position into a binary electrical code. In general, whatever type encoder is used, the encoder 66 is provided with a common input lead and an output lead corresponding to each contact, or binary position. Such output leads are connected in parallel to the input terminals of the shift register 67 which is a conventional parallel-input/serial-output data feedback shift register, in the terminal processor. The shift register 67 may suitably be similar to type MM409/MM509, Serial-in/Parallel-in, Serial-out 8-bit Static Register, manufactured by National Semiconductor Corporation. The data feedback signal on lead 69 is also coupled to shift register 67 and permits loading of shift register 67 by the parallel inputs from encoder 66. A train of clock pulses, generated by clock generator 47 or by a separate clock generator 71, from the 60 Hz reference, is coupled to shift register 67 and causes the bit information contained therein to be sequentially emitted in the form of voltage pulses, which pulses carry in time sequence the data information which had been stored in the register.

In addition to remote reading of watthour meters, a large number of other data devices can be monitored by the system of this invention. A partial list of the most likely applications is as follows:

A. Residential Locations
1. Read main watthour meter.
2. Read water heater watthour meter.
3. Read gas meter.
4. Read water meter.
5. Read any meter often enough to conduct a load survey.
6. Report low voltage conditions.
7. Report fire/burglar alarms.
8. Monitor television receiver channels for use in rating program popularity.

B. Distribution Transformers
1. Read current and/or KVA.
2. Read demands.
3. Read voltage.
4. Read temperature.
5. Repeat readings for load survey studies.
6. Report loss of voltage.

C. Capacitor Banks

1. Read voltage and/or power factor.
2. Check condition of capacitors.

D. Unit Substations
1. Read selected instruments and meters.
2. Report alarm conditions.
3. Report substation status.

Figure 7:
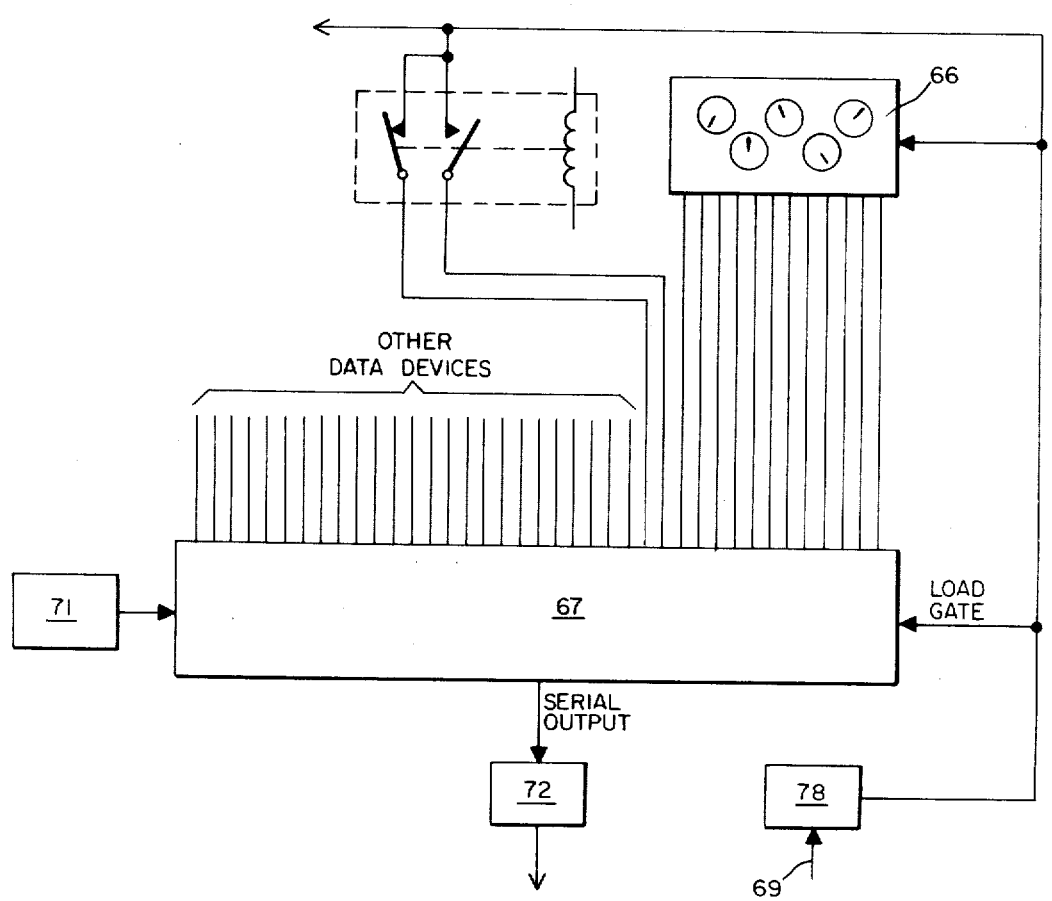
FIG. 7 is a combined block diagram and schematic diagram of apparatus for detecting encoded data.

Referring now to FIG. 7, a more detailed description of a suitable method for encoding meter and other data, and one which is compatible with the system of this invention, is shown in diagrammatic form. Shift register 67 contains a plurality of bistable circuits, such as flip-flops, each containing one bit of information stored therein. The data feedback signal from line 69 is applied to a conventional single shot circuit 78, which generates an 8 millisecond pulse, which pulse is applied to the load gate of shift register 67, enabling it to receive input signals into each bit position. The 8 millisecond pulse is also coupled to a register encoder 66, which encoder has a plurality of output lines corresponding to the contact positions within. For each closed contact, the 8 millisecond pulse will be transmitted through encoder 66, and load a corresponding position of shift register 67 with a binary "1." Shift register positions corresponding to open contacts will retain a binary "0." Thus, at the termination of the 8 millisecond pulse signal, the shift register 67 is loaded with the binary information corresponding to the meter which has been read. Similarly, the 8 millisecond pulse can be applied to a plurality of other data devices, such as alarm relays, or any other data collecting device susceptible of binary codification. Although shift register 67 is shown as containing a plurality of other parallel data input positions, it is understood that further logic circuitry could be utilized to reduce the number of shift register positions to less than the number of total binary bits which can be collected from any given terminal processor. Thus, the outputs of different data devices could be coupled to addressable AND gates, which in turn would be coupled to the shift register. Each data device, then, would be monitored independently of the others.

Referring again to FIG. 4, the output of shift register 67 is in the form of a pulse train, each pulse representing a binary "1" being of a high voltage, and each pulse representing a binary "0" being of a correspondingly lower voltage. The pulse train is coupled to a conventional Schmitt Trigger 72, a circuit having two stable states, its state being determined by the input signal coupled to it. The Schmitt Trigger 72 generates at its output a voltage which is above a predetermined level corresponding to each binary "1" pulse at its input, and a voltage below such predetermined level corresponding to each binary "0" pulse. This output from the Schmitt Trigger 72 is coupled into a pair of anti-parallel silicon controlled rectifiers (SCR's) 73 which operate a conventional carrier modulate relay 74.

The anti-parallel SCR's 73 in combination with the relay 74 provide a novel method for information feedback to the group processor, which is shown in detail in FIG. 8. In FIG. 8a, the output from the Schmitt Trigger is shown applied to the trigger terminals of the two SCR's. The SCR anode and cathode terminals are coupled in series with a relay coil 77 to the AC power supply, which provides the conventional 60 Hz power frequency current. When the signal from the Schmitt Trigger is in a high state, corresponding to a binary "1," the output exceeds the trigger voltage of the SCR's, such that first one SCR and then the other will be driven into conduction every cycle. Correspondingly, the normally open contacts 80 of relay 74 will be closed at a rate of 120 cycles per second, thus shorting parallel resonant circuit 30, causing it to have an impedance as shown in FIG. 8b. It is recalled that during the 0.5 second time period that the terminal processor holds the address and command information in its shift register 46, a continuous high frequency carrier signal is transmitted from the group processor over the neutral line. At the group processor, the effective impedance seen looking down the neutral 20 will vary at 120 Hz, in accordance with the periodic short circuiting of tank 30. Consequently, the resultant carrier current will be as shown in FIG. 8b, being a squarewave envelope having a modulation frequency of 120 Hz.

Referring now to FIG. 9, the operation of the group processor in detecting the 120 Hz carrier current pulse wave can be understood. The carrier signal generator 90, a conventional RF oscillator, is shown as an idealized current generator in series with a line resistor 91, the series combination being shunted to ground by parallel resonant circuit 25. Another path from neutral wire 20 to ground is composed of a diode rectifier 92 and two RC combinations of unequal time constant, 93 and 94. While the time constants of the two RC combinations differ from each other typically by a factor of 10, both time constants are substantially longer than the period of the carrier signal but relatively short in comparison with the 120 Hz signal. Consequently, under normal operation conditions diode 92 rectifies the carrier current, and a DC voltage appears across each of the capacitors 97 and 98. The two capacitor voltages are coupled to a differential amplifier 95, the output of which is coupled in a feedback loop to control circuitry 96 contained within group processor 12. Under normal steady state conditions each input to the differential amplifier 95 is equal, and the output thereof is zero. However, modulation of the carrier current by relay 74 will cause a 120 Hz time varying signal across resistor 91, resulting in differing voltages across capacitors 97 and 98. Since the two RC time constants differ by a factor of 10, the output of differential amplifier 95 would be appreciably a 120 Hz squarewave which is time synchronized to the operation of relay 74. The presence of a pulse output would indicate the transmission of a binary "1" in the data train, and the absence of pulse output the presence of a binary "0." The output signal, then is fed in time serial form to control circuitry 96, from whence the group processor transmits it to central computer 11.

The method of transmitting coded information from the terminal processor to the group processor, as diagrammed in FIGS. 8 and 9, is the preferred method for use with this system. However, it is obvious that alternate circuitry of functional equivalence could be utilized, particularly in combination with the split-core transformer 40. A more conventional technique comprises coupling the output from the Schmitt Trigger 74 to an RF oscillator which is coupled to the neutral through transducer 41. It is understood that if this alternate technique is adopted, the group processor is programmed to discontinue RF transmission during the 0.5 second time delay period.

Figure 5:
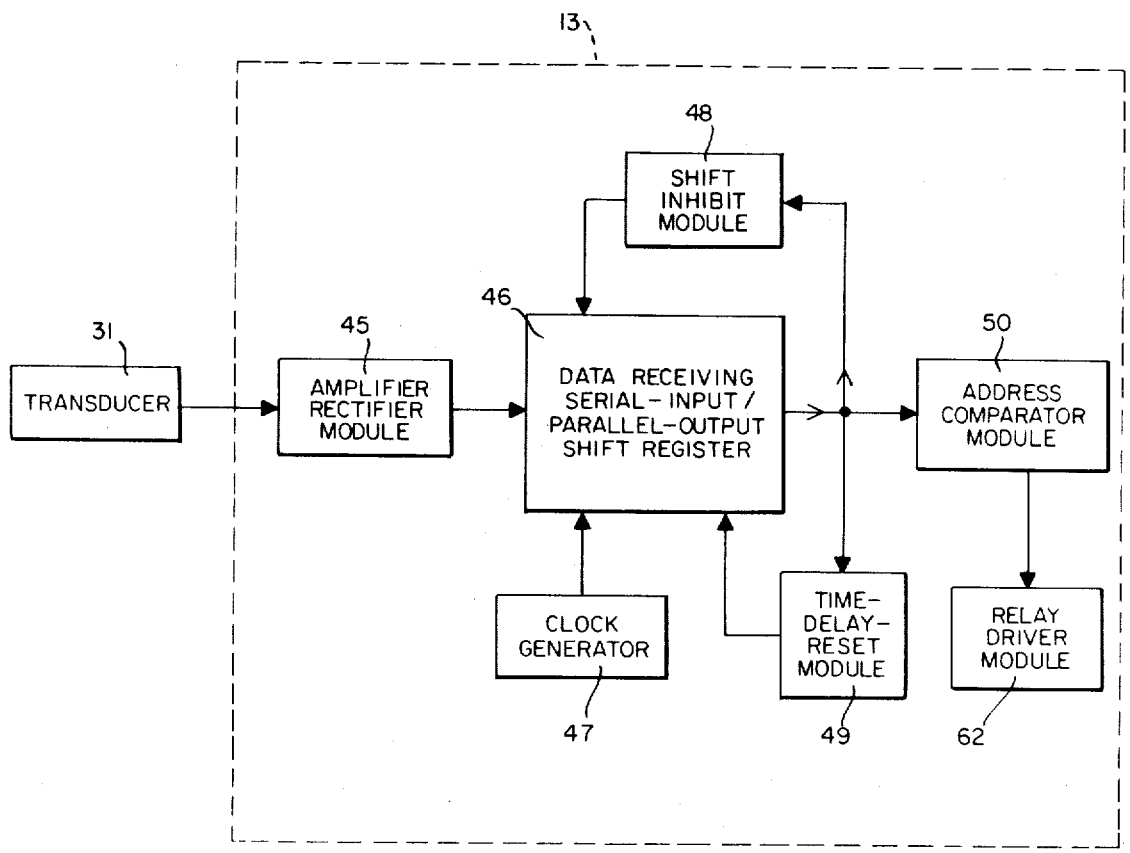
FIG. 5 is a block diagram of a terminal processor showing the flow of information for a command to operate a relay driver module.

Referring now to FIG. 5, a block diagram is shown showing the information flow for operating a relay driver module 62. The relay driver module 62, typically a conventional open-close relay of solenoid or solid state type, is the device which interfaces between the communication system of this invention and any apparatus which can be electrically drive. Examples of apparatus which can be controlled by the system of this invention include, but are not limited to, electric water heaters, cold storage air conditioner compressors, stored energy heating elements, capacitor banks, and switches in unit substations. Although no feedback is shown in FIG. 5 to indicate completion of the commanded operation, it is to be noted that such information could be obtained by coupling the relay-controlled device into a shift register circuit as shown in FIG. 7.

The operational requirements of group processor 12 can now be reviewed in terms of the system functions described above. Upon receipt of coded information which is to be coupled to the neutral line, a carrier control gate is required to modulate carrier signal generator 90. A conventional rectifier circuit rectifies the coded information received form central computer 11, and transforms it into pulse voltages to gate signal generator 90 on and off corresponding to the coded signals. Suitable amplifier and transmitter circuits receive data back from the terminal processors, and transmit it to the central computer. It is within the scope of this invention that the central computer could command the group processor to sequentially interrogate each terminal processor tied within its group, collect back data, and send all collected data corresponding to the group back to the computer in a continuous package. Under such circumstances, the group processor would contain stored information corresponding to the addresses of all terminal processors in its group, and would contain buffer storage for collection and retention of received data prior to transmission of same back to the computer. It is understood that any division of logic functions between the central computer and the group processors may be designed into the system, and be within the scope of this invention. In the preferred embodiment, all logical command operations are generated in the computer, with the group processor being essentially a passive device for transmitting and collecting data within its group. However, should economic factors dictate a decentralization of control, this can easily be achieved by increasing the logic circuitry and storage in the group processors.

The system as described above is seen to have a capacity for total communications throughout the electric power utility. It has the capability of interrogating and reading data devices, and commanding functional operations. The commands may be in the form of system, or mass instructions, individually addressable instructions, or sequential instructions. Complete two-way communication is provided between the central controller and every terminal unit in the system, and terminal units and intermediate (group) units can communicate with each other through the central controller. The extent of the communication system as described is limited only by the existence of a neutral conductor. In locations where a neutral conductor is not available, as where the neutral in underground cables is continuously grounded, a separate neutral wire may be provided. While most electric power utilities have similar distribution networks wherein the neutral is continuously available, it is appreciated by those skilled in the art that in locations where no neutral is available, and only phase wires are available, the system can be coupled to such phase wires by existing techniques. The absence of the neutral would increase the expense and reduce the reliability of the system in such locations.

An overall consideration of the system herein presented must place great importance on the programming of the central computer, the required software to insure system reliability, and the interfacing of the computer and the group processor units. In the preferred embodiment of this system a central computer contains a data bank of storage with respect to the data devices of each terminal processor, as well as data collected from other utility installations such as transformers, capacitor banks, etc. The data bank is compiled from external inputs relating to system parameters, e.g., terminal addresses, group addresses, etc., as well as the internally generated information coming from the data devices. While a suitable data word has been described as containing 32 bits, additional bits may be added as parity checks, or redundance can be worked into the commands to insure that they are properly received. As was discussed hereinabove, the data bank may be distributed among the central computer and the group processors, each group processor storing specified data relating to terminals within its subdivision. Such an arrangement could be useful for executing addressable functions simultaneously in a plurality of group subdivisions. It is apparent to one skilled in the art that software considerations will play a large role in achieving optimum efficiency of the system of this invention. Such software considerations, and tradeoffs between software and hardware, are a part of and within the scope of this invention.

I claim:

1. A computer-controlled communication system for an electric power utility for communicating with terminal points of its energy transmission network by means of high frequency coded signals, comprising:
   a. a plurality of group signal transceivers, each in communications linkage with said computer, for receiving coded data signals from said computer and channeling them to said terminal points at said high frequency, and for transmitting system data to said computer;
   b. signal processing means having a terminal signal processing unit located at each of said terminal points, for receiving and processing said high frequency coded signals, and for generating system data;
   c. a signal transmission network for transmitting said coded signals from said transceivers to said signal processing means comprising the neutral of said power utility transmission network and ground return;
   d. terminal coupling means for coupling said signal processing means to said neutral;
   e. transceiver coupling means for coupling each of said group signal transceivers to said neutral and for limiting to a respective group transceiver communication of such coded signals with a specific group of said terminal signal processing units;
   f. each such terminal signal processing unit comprising:
      i. data receiving means for detecting and storing said high frequency coded signals;
      ii. data processing means, coupled to said data receiving means, for processing said received coded signals to generate an electrical signal in accordance with the information content thereof;
      iii. function driver means, coupled to said data processing means, for generating electrical signals to perform functions specified by said coded signals;
      iv. data device reading means, coupled to said data processing means, for interrogating and deriving coded information from data devices coupled to the respective terminal processor, in accordance with the information content of said received coded signals; and,
      v. data transmitting means, coupled to said data device reading means, and cooperating with that group transceiver with which said respective terminal signal processing unit is in communications linkage for transmitting such derived data thereto; and
   g. wherein said data receiving means comprises:
      i. amplifier receifier means for demodulating said high frequency coded signals and generating pulses representing data bits;
      ii. a shift register, having a plurality of bit positions, coupled to said amplifier rectifier means;
      iii. a clock generator, coupled to and cooperating with said shift register, for loading said pulses into said shift register;
      iv. shift inhibit means, for inhibiting loading of further pulses into said shift register after it has been fully loaded; and,
      v. time delay-reset means, for resetting said shift register after a predetermined time delay.

2. The system as described in claim 1, wherein said shift register is of the serial-input parallel-output type and said data processing means includes an address comparator comprising two multiple input logic circuits having their inputs coupled to respective outputs of said shift register, each of said logic circuits providing a signal output when all input signals thereto are of the same sense, and a third logic circuit, the output signals of said two logic circuits being applied to respective inputs of said third logic circuit, said third logic circuit providing an output signal when all signal inputs are of the same sense.

3. The system as described in claim 2 wherein said shift register is of the serial-input parallel-output type and said data processing means comprises a first AND circuit having a plurality of inputs coupled to respective output positions of said shift register, a negative AND circuit having a plurality of inputs coupled to other respective output positions of said shift register, the respective couplings of said shift register output positions with respective input positions of said first AND circuit and said negative AND circuit constituting a fixed address, an inverter coupled to the output of said negative AND circuit, and a second AND circuit having input terminals coupled to the outputs of said AND circuit and said inverter, whereby the binary information in some of said shift register positions is compared with the fixed address information represented by the connections of said AND circuit and said negative AND circuit, such that an output signal of said second AND circuit is produced only when such binary information in said some of said shift register positions corresponds to said fixed address information.

4. The system as described in claim 3 wherein said second AND circuit is a three-input circuit, having a third input connected to the first position of said shift register.

5. The system as described in claim 4 wherein said function driver means comprises a mass AND circuit having one input coupled to said first position of said shift register and another input coupled to another output position of said shift register.

6. The system as described in claim 5, wherein said function driver means comprises an addressable AND circuit having one input coupled to the output of said second AND circuit and another input coupled to an output position of said shift register.

7. The system as described in claim 6, wherein said function driver means comprises an addressable AND circuit having one input coupled to the output of said second AND circuit and another input coupled to an output position of said shift register, and a mass AND circuit having one input coupled to said first position of said shift register and another input coupled to another output position of said shift register.

8. The system as described in claim 7, wherein said data device reading means comprises a parallel-input serial-output shift register, coupling means for coupling into said shift register the data in an encoded data device, and a clock generator for shifting out the data in said shift register.

9. The system as described in claim 8, wherein said data transmitting means comprises a Schmitt Trigger, a pair of silicon controlled rectifiers in antiparallel configuration and coupled to a relatively low frequency source, the gates thereof being driven by the output of said Schmitt Trigger, and a carrier modulate relay coupled to and driven by said silicon controlled rectifiers, said carrier modulate relay being in parallel with the associated terminal resonant circuit, whereby the high frequency impedance across said resonance circuit is time-modulated at twice said relatively low frequency.

10. The system as described in claim 9, wherein each group processor includes a high frequency current generator coupled to said neutral for generating a continuous high-frequency current which is transmitted over said neutral, said current generator cooperating with said carrier modulate relay to produce a pulse coded high frequency current, and differential amplifier apparatus in said group processor for detection of said high frequency pulse modulated current.

11. In an electric power utility having a power transmission network with a continuous neutral wire connected to system ground at multiple points, such system ground being electrically separate from earth ground by a finite impedance, and said power transmission network having at least one phase wire, apparatus comprising:

a. high frequency signal generator means for generating high frequency coded signals, and having a pair of output terminals;

b. first coupling means at a first point on said network for coupling said high frequency coded signals between said neutral and earth ground, a first of said output terminals being at system ground and the second of said output terminals being at earth ground;

c. a closed path transmission network comprising said neutral and earth ground return, for transmission of said high frequency signals between said first point and said multiple system ground points;

d. signal processing means having a terminal signal processing unit located at each of said multiple points for receiving and processing said high frequency coded signals, and for generating system data, each said unit having one electrical terminal at system ground and another electrical terminal at earth ground; and e. whereby said coded signals generated at said first point are developed across said finite impedance between system ground and earth ground at such first point, and said coded signals received at each of said multiple points are developed across said finite impedance between each such system ground point and earth ground.

12. The system as described in claim 11 wherein said second output terminal is connected through a metallic ground rod to earth ground, and said another electrical terminal of each terminal processing unit is connected to earth ground through a metallic ground rod.

13. An electric power utility communication system for transmission of coded signals to and from points a neutral on an electric energy transfer network, such network including a neutral conductor and operating at power frequency, comprising:

a. signal generating means for generating coded high frequency electric signals at a first point on said network;

b. a signal transmission network for transmitting said coded high frequency signals from said first point to at least one other point on said network, said signal transmission network comprising a closed loop in which are included a first path consisting of said neutral conductor connected between said first point and said other point, and a second path consisting of ground return between said two points;

c. neutral coupling means, coupling said neutral to system ground at a plurality of points on the network, said system ground being electrically separate from earth ground by a finite impedance, said plurality containing at least said first point;

d. first coupling means coupling said signal generating means between system ground and earth ground;

e. signal processing means at said other point for processing said coded high frequency signals;

f. second coupling means, coupling said signal processing means to said neutral at said other point;

g. said coded signals being transmitted over a closed path defined by said neutral, ground, first coupling means and second coupling means; and h. wherein said neutral is connected to system ground at said one other point, and said second coupling means comprises a metallic ground rod in connection with earth ground, whereby the processing means is connected between said system ground and earth ground.

14. The system as described in claim 13, wherein said signals are transmitted from said first point to respective signal processing means at a plurality of other points on said network, each such signal processing means being coupled to said neutral conductor and to system ground at a respective other point, and comprising:
   a. data receiving means for receiving said coded signals;
   b. address comparator means for determining when said each signal processing means has been addressed;
   c. data reading means, controlled by said address comparator means, for reading encoded data; and
   d. return data transmitting means for generating coded return signals representing said encoded data.

15. The system as described in claim 3, wherein said transmission network extends over a portion of said electric energy transfer network having at least one transformer, the neutral conductors one each side of said transformer being connected to provide a continuous neutral transmission path.

16. The system as described in claim 15, wherein a blocking parallel resonant circuit is connected in series with said neutral conductor at a point beyond which transmission of said coded signals is desired to be inhibited, said blocking circuit having a substantial impedance at said high frequency and a negligible impedance at the power frequency, thereby blocking transmission of coded signals from said signal generating means beyond the point of connection of said blocking circuit while permitting substantially uninhibited transmission of power frequency current therethrough.

17. The system as described in claim 16, having a plurality of blocking circuits functionally identical with said blocking circuit, said blocking circuits being located such as to confine the transmission of said signals to specific portions of said neutral conductor, thereby delimiting a group of said signal processing means which are in high frequency communication with said signal generating means.

18. The system as described in claim 17 in which each of said signal generating means additionally has circuitry for receiving high frequency electric signal information and generating coded high frequency signals in accordance therewith, said system also including a computer having capacity for generating and transmitting said high frequency electric signal information to the plurality of signal generating means, and communication coupling means coupling said computer to each of said signal generating means for high frequency electric communication therewith.

* * * * *